(12) United States Patent
Matsuda

(10) Patent No.: US 7,174,196 B2
(45) Date of Patent: Feb. 6, 2007

(54) IMPLEMENT FOR MOBILE PHONE

(76) Inventor: Yasutoshi Matsuda, 2-5-10-202, Furuishiba, Koto-ku, Tokyo (JP)

( * ) Notice: Subject to any disclaimer, the term of this patent is extended or adjusted under 35 U.S.C. 154(b) by 17 days.

(21) Appl. No.: 11/178,281

(22) Filed: Jul. 12, 2005

(65) Prior Publication Data

US 2006/0205441 A1  Sep. 14, 2006

(51) Int. Cl.
*H04M 1/00* (2006.01)
(52) U.S. Cl. .............. 455/575.6; 455/556.1; 455/557; 381/384; 381/74; 379/430; 224/600
(58) Field of Classification Search ......... 455/575.6, 455/556.1, 557; 381/384, 74; 379/430; 224/600
See application file for complete search history.

(56) References Cited

U.S. PATENT DOCUMENTS 6,707,924 B1*  3/2004  Okiebisu ............... 381/385
2002/0043545 A1*  4/2002  Tang ..................... 224/600
2002/0065115 A1*  5/2002  Lindholm .............. 455/568
2002/0090099 A1*  7/2002  Hwang .................. 381/312
2005/0069147 A1*  3/2005  Pedersen ................ 381/74
2006/0062413 A1*  3/2006  Wehrell ................. 381/333
2006/0126881 A1*  6/2006  Ito et al. ................ 381/374
2006/0210092 A1*  9/2006  Navid ................... 381/74

* cited by examiner

*Primary Examiner*—Danh Cong Le
(74) *Attorney, Agent, or Firm*—Berenato, White & Stavish

(57) ABSTRACT

A mobile phone implement is capable of hearing a voice from the mobile phone or communicating with the ear and capable of easily loading and unloading the earphone and the cord. The mobile phone implement comprises a neck strap that is capable of being attached to a mobile phone and being suspended from a neck of human being and a fastener. The fastener makes a slider slide towards a direction of the base end portion of the neck strap to carry out an open motion. The mobile phone implement comprises a container section formed between the neck strap and the fastener, an earphone unit having a cord whose plug side cord portion is stored in the container section, and folding means for bending a cord to fold the cord provided to an earphone unit which is capable of being connected to the mobile phone.

10 Claims, 13 Drawing Sheets

IMPLEMENT FOR MOBILE PHONE

CROSS-REFERENCE TO RELATED APPLICATIONS AND CLAIM TO PRIORITY

This application is related to application number 2005-065501, filed Mar. 9, 2005 in Japan, the disclosure of which is incorporated by reference and to which priority is claimed.

FIELD OF THE INVENTION

The present invention relates to an implement for use in a mobile or cellular phone, and more particularly, to an implement for a mobile phone that is for attaching a cord and an earphone of earphone unit having the cord which is capable of being connected to the mobile phone, to a neck strap, in order to hear a voice from the mobile phone or to communicate with another mobile phone without putting the mobile phone to an ear and in order to be easy to load and unload the earphone and the cord.

BACKGROUND OF THE INVENTION

Recently, a television mobile phone and a mobile phone having a function for hearing music have become known. In case of using the television mobile phone or the function for hearing music in the mobile phone, there is a problem in which it is difficult to use an earphone or a microphone which is installed in a conventional mobile phone or it is impossible to use the earphone or the microphone which is installed in the conventional mobile phone.

More particularly, there is a problem in which it is difficult to hear voice or sounds such as when the arm is tired from the holding the mobile phone or when putting the earphone of mobile phone to the ear in case of hearing music. In addition, there is a problem in which it is difficult to hear and to speak when communicating with another mobile phone while watching a picture, using the earphone and the microphone which are installed in the mobile phone, in case of using the television mobile phone. Furthermore, disadvantage may occur in which an enlarged picture of ear is imaged on a screen when the earphone is thoughtlessly put to the ear because it is difficult to hear.

Under the circumstances, there is a problem in which convenience is bad inasmuch as it is necessary to carry out a complicated operation when the earphone and the cord connected to the earphone are taken out of and stored in the mobile phone, in case where the earphone having the cord is attached to the mobile phone.

In order to improve the convenience of dealing with the earphone and the cord, it is known from Japanese Unexamined Patent Publication Tokkai 2001-274886 to place about the neck strap device for mobile phone.

The neck strap device for mobile phone comprises a suspending string for suspending the mobile phone to the neck and an earphone cord for use in connecting the earphone and the microphone to the mobile phone through a plug. A middle section of the earphone cord that leads from the plug to the earphone and the microphone is held along the suspending string.

As a result, the deals of the earphone cord and the suspending string are simplified without obstacle, when suspending the mobile phone to the neck and using the earphone and the microphone in case of communicating with another mobile phone.

However, there is problem in which the earphone and the cord connected to the earphone are obstacles or the appearance is bad, inasmuch as the earphone and the cord connected to the earphone are not stored in the mobile phone when the earphone is not used, in the above-mentioned neck strap device for mobile phone. In addition, it is difficult to store in a pocket or a bag, inasmuch as the earphone and the cord connected to the earphone bulk in the pocket or the bag in case of the neck strap device for mobile phone is stored in the pocket or the bag.

SUMMARY OF THE INVENTION

Under the circumstances, it is therefore an object of the present invention to provide a mobile phone implement that is for attaching a cord and an earphone of earphone unit having the cord which is capable of being connected to the mobile phone, to a neck strap, in order to hear a voice from the mobile phone or to communicate with another mobile phone without putting the mobile phone to an ear and in order to be easy to load and unload the earphone and the cord.

In order to accomplish the above-mentioned object, there is provided a mobile phone implement comprising a neck strap having a predetermined width that is capable of being attached to a mobile phone and being suspended from a neck of human being, a fastener having a predetermined length that is attached from a base end portion of the neck strap towards a longitudinal direction of the neck strap, the fastener making a slider slide towards a direction of the base end portion of the neck strap to carry out an open motion, a container section formed between the neck strap and the fastener on the basis of attachment of the fastener, and folding means positioned near an open beginning end of the fastener for bending a cord to fold the cord provided to an earphone unit which is capable of being connected to the mobile phone. According a first aspect of the present invention, the mobile phone implement is configured to store a plug side cord portion of the earphone unit in the container section and to store an earphone and an earphone side cord portion of the earphone unit that is folded by the folding means.

According to the first aspect of the present invention, it is possible to hear the sound or voice from the mobile phone without positioning a mobile phone main body when combining the mobile phone implement with the earphone unit having the cord which is capable of being connected to the mobile phone. Alternatively, it is possible to communicate with another mobile phone without positioning a mobile phone main body when combining the mobile phone implement with the earphone unit. Furthermore, it is possible to store the earphone and cord in the container section and to easily take the earphone and cord out of the container section.

According to a second aspect of the present invention, there is provided a mobile phone implement comprising a neck strap having a predetermined width that is capable of being attached to a mobile phone and being suspended from a neck of human being, a fastener having a predetermined length that is attached from a base end portion of the neck strap towards a longitudinal direction of the neck strap, the fastener making a slider slide towards a direction of the base end portion of the neck strap to carry out an open motion, a container section formed between the neck strap and the fastener on the basis of attachment of the fastener, an earphone unit having a cord whose plug side cord portion is stored in the container section, the earphone unit being capable of being connected to the mobile phone, and folding means positioned near an open beginning end of the fastener for bending a cord to fold the cord provided to the earphone unit. The mobile phone implement is configured to store an earphone and an earphone side cord portion of the earphone unit that is folded by the folding means.

According to the second aspect of the present invention, it is possible to hear the sound or voice from the mobile phone without positioning a mobile phone main body when combining the mobile phone implement with the earphone unit having the cord which is capable of being connected to the mobile phone. Alternatively, it is possible to communicate with another mobile phone without positioning a mobile phone main body when combining the mobile phone implement with the earphone unit. Furthermore, it is possible to store the earphone and cord in the container section and to easily take the earphone and cord out of the container section.

According to a third aspect of the present invention, an aperture is formed on said neck strap and/or the fastener near both ends of the container section. An eyelet is formed in the aperture.

According to the third aspect of the present invention, it is possible to introduce the cord into the container section through the aperture. Furthermore, it is possible to prevent the aperture from damage by the eyelet and to make the cord smoothly move.

According to a fourth aspect of the present invention, the cord is cut into a predetermined length which is adapted to the neck strap and a used state. The cut portions are connected to each other by jointing portions.

According to the fourth aspect of the present invention, it is possible to improve the convenience and to make the appearance be good, inasmuch as the length of the cord is adjusted in accordance with the neck strap in case of using a commercial earphone unit.

According to a fifth aspect of the present invention, the neck strap is shaped into a hollow shape in a cross section in an attached part of the neck strap that is attached to said fastener.

According to the fifth aspect of the present invention, it is possible to use the hollow section of the neck strap as the container section too and to enlarge the volume of the container section. As a result, it is possible to easily store the earphone side cord portion and the earphone in the container section. In addition, it is possible to make the width of the neck strap be small inasmuch as the volume of the container section is large.

According to a sixth aspect of the present invention, a part, which is for use in storing the earphone, has a large volume in the container section, in order to easily store the earphone in the container section.

According to the sixth aspect of the present invention, it is possible to easily store the earphone in the container section and easily take the earphone out of the container section.

According to a seventh aspect of the present invention, there is provided a mobile phone implement comprising a neck strap having a predetermined width that is capable of being attached to a mobile phone and being suspended from a neck of human being, a cloth body attached from a base end portion of the neck strap towards a longitudinal direction of the neck strap, the cloth body forming a container section between the neck strap and the cloth body, an earphone unit having a cord which is capable of being stored in the container section and which being connected to the mobile phone, a reel section having a rotatable electric contact portion, the reel section pushed towards one direction for reeling an earphone side cord portion of the earphone unit and for temporarily stop a reeling motion for the earphone side cord portion by a ratchet mechanism, a reel storing section formed in a part of the container section for storing the reel section therein, and a fastener section having a predetermined length that is positioned at a tip portion of the cloth body, the fastener section making a slider slide to open and close a part of said container section, in order to store an earphone of said earphone unit in the container section. The mobile phone implement is configured to reel the earphone side cord portion of the earphone to the reel section and to store the earphone by opening and closing the fastener section and to take the earphone side cord portion out of the reel section in an optional length.

According to the seventh aspect of the present invention, it is possible to hear the sound or voice from the mobile phone without positioning a mobile phone main body when combining the mobile phone implement with the earphone unit having the cord which is capable of being connected to the mobile phone. Alternatively, it is possible to communicate with another mobile phone without positioning a mobile phone main body when combining the mobile phone implement with the earphone unit. Furthermore, it is possible to easily and automatically store the earphone and cord in the container section and to easily take the earphone and cord out of the container section in the optional length.

According to an eighth aspect of the present invention, there is provided a mobile phone implement comprising a neck strap having a predetermined width that is capable of being attached to a mobile phone and being suspended from a neck of human being, a flexible member having a predetermined length that is attached from a base end portion of the neck strap towards a longitudinal direction of the neck strap, a container section formed between the neck strap and the flexible member by attachment of the flexible member, a setting section formed on the flexible member for setting an earphone of an earphone unit having a cord which is capable of being connected to the mobile phone, a long groove formed along a longitudinal direction of the flexible member for communicating with the setting section, and folding means positioned near an end portion of the flexible member for folding the cord of said earphone unit. The mobile phone implement is configured to store a plug side cord portion of the earphone unit in the container section and to store an earphone side cord portion folded by the folding means, in the long groove with removability. Furthermore the mobile phone implement is configured to set the earphone in the setting section with removability.

According to the eighth aspect of the present invention, it is possible to hear the sound or voice from the mobile phone without positioning a mobile phone main body when combining the mobile phone implement with the earphone unit having the cord which is capable of being connected to the mobile phone. Alternatively, it is possible to communicate with another mobile phone without positioning a mobile phone main body when combining the mobile phone implement with the earphone unit. Furthermore, it is possible to store the earphone and cord in the container section and to easily take the earphone and cord out of the container section.

According to a ninth aspect of the present invention, the earphone unit comprises two earphones which are positioned on left and right ears, respectively. The container section is provided to each of left and right neck strap portions which are positioned near a base end portion of the neck strap, in order to store two earphone and cords which are connected to two earphones, respectively.

According to the ninth aspect of the present invention, it is possible to listen in a stereo sound. Furthermore, it is possible to easily store two earphones and the cord in the container section and to easily take two earphones and the cord out of the container section.

According to a tenth aspect of the present invention, the earphone has a microphone.

According to the tenth aspect of the present invention, it is possible to communicate with another mobile phone by using the earphone having the microphone.

DESCRIPTION OF THE PREFERRED EMBODIMENT(S)

Figure 1:
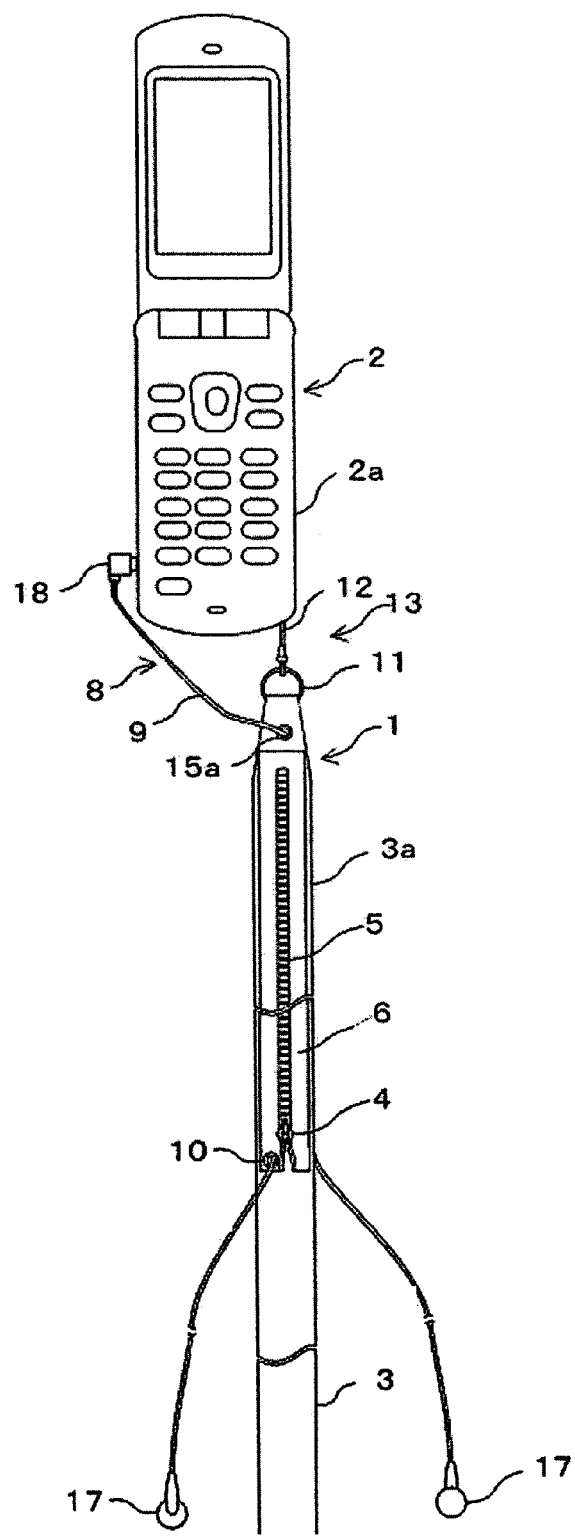
FIG. 1 is a plan view illustrating the mobile phone implement claimed in Claim 2 of the present invention attached to a mobile phone.
Figure 2:
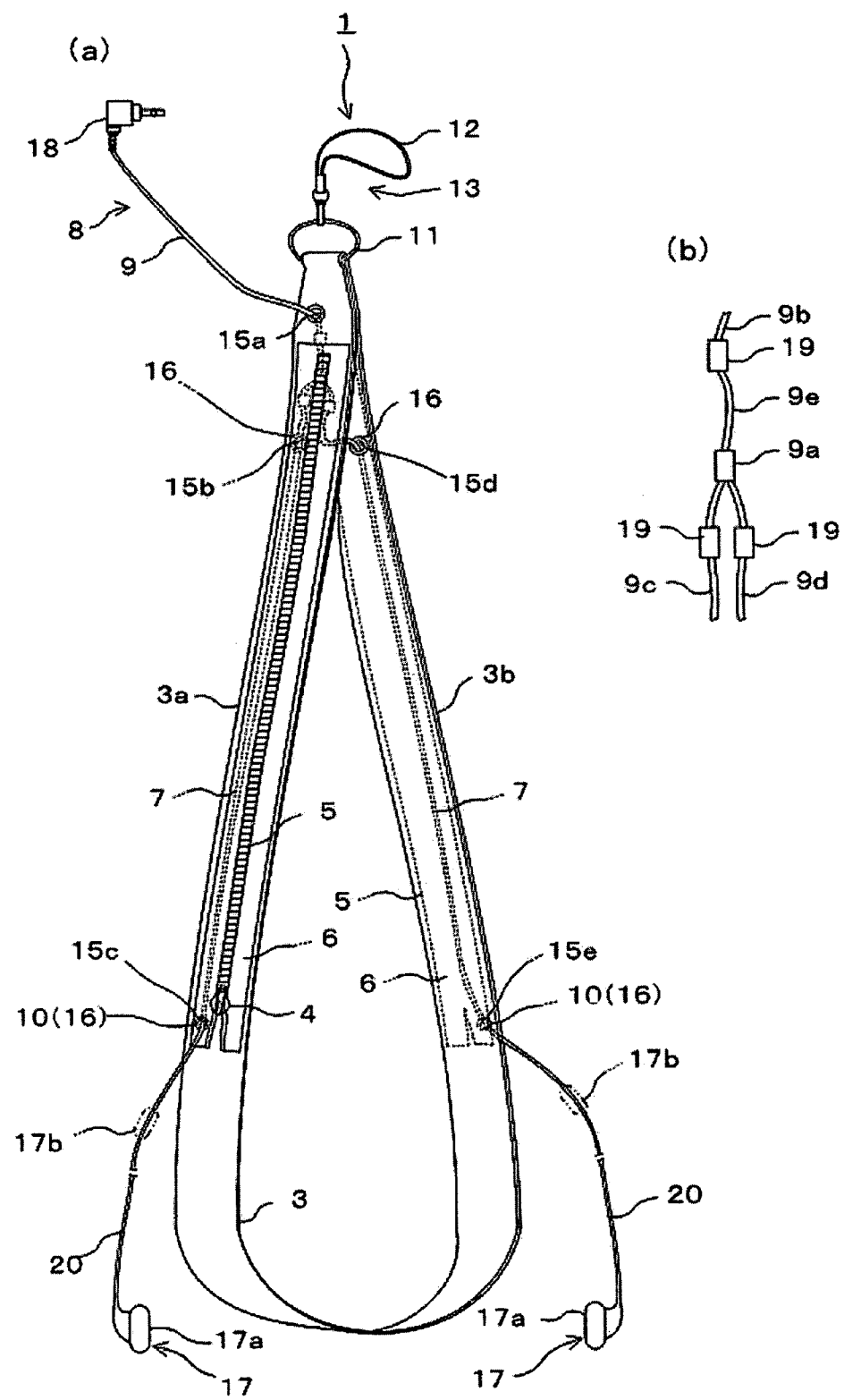
FIG. 2(a) is a perspective view illustrating the mobile phone implement claimed in Claim 2 of the present invention.
FIG. 2(b) is a plan view illustrating a portion of cord in the mobile phone implement claimed in Claim 2 of the present invention.

Description will be made as regards embodiments of the present invention with reference to drawings. In FIGS. 1 and 2, a mobile phone implement 1 is for use with a mobile phone 2 and comprises a neck strap 3, left and right fasteners 5, container sections 6, an earphone unit 8 having cords, and folding means 10. The neck strap 3 has a predetermined width and is capable of being attached to the mobile phone 2 and is capable of being suspended from the neck of human beings. Each of the left and the right fasteners 5 has a predetermined length. The left and the right fasteners 5 are attached from a base end portion to longitudinal directions of left and right neck strap portions 3a and 3b of the neck strap 3, respectively, and form a slider 4 that slides towards the base end portion of neck strap 3 in order to carry out an open action. The container sections 6 are formed between the left and the right neck strap portions 3a and 3b and the fasteners 5, respectively, by attachment of the fasteners 5. The plug side cord portions 7 of earphone unit 8 are stored in the container sections 6 and the earphone unit 8 is capable of being connected to the mobile phone 2. The folding means 10 are installed near open beginning end and bend the cords of earphone unit 8 to fold the cords.

The neck strap 3 is composed of a cloth, a skin, a soft synthetic resin, or the like and is formed into a belt shaped body. Both of the base end portions are connected to each other in the neck strap 3 in order to form the neck strap into a loop shape. A ring 11 is installed on a tip of base end portion and a strap attachment 13 having a connecting string 12 is attached to the ring 11.

In addition, both sides and an opening end side are connected to the neck strap 3 in each of the fasteners 5. The bag shaped container sections 6 are formed between the neck strap 3 and the fasteners 5.

Furthermore, a first aperture 15a is formed on the left neck strap portion 3a near the base end portion of the neck strap 3. A second aperture 15b is formed on the left neck strap portion 3a near the upper end (upper end in the drawing) of the left container section 6. A third aperture 15c is formed on the fastener 5 near the lower end (lower end in the drawing) of the left container section 6. A fourth aperture 15d is formed on the right neck strap portion 3b near the upper end (upper end in drawing) of the right container section 6. A fifth aperture 15e is formed on the right neck strap portion 3b near the lower end (lower end in drawing) of the right container section 6.

Eyelets 16 are formed on the neck strap 3 or the fasteners 5 with respect to the apertures 15a to 15e. The eyelets 16, which correspond to the third and the fifth apertures 15c and 15e, are used as the above-mentioned folding means 10.

In addition, the earphone unit comprises two earphones 17 each of which has a microphone, in order to position the earphones 17 in the left and right ears, respectively. The cords 9, which extend from the plugs 18, are branched and are connected to the earphones 17, each of which has the microphone.

Incidentally, the earphones 17 having the microphones are for stereo sound. Alternatively, the earphones 17 may be for monaural sound. The microphone (not shown) is integral with the earphone section 17a in each of the earphones 17 having the microphones. Alternatively, a microphone 17b may be apart from the earphone section 17a and may be located at a position which is positioned on cord 9 near the mouth and which is illustrated in a virtual line. Furthermore, the microphone may be attached to a tip of an arm which extends from the earphone section 17a to a position near the mouth, although illustration is not made. In this case, two microphones are provided for stereo sound. Alternatively, one microphone may be provided for monaural sound.

The above-mentioned cord 9 has a predetermined length which is adapted to the length of neck strap 3 and which is adapted to the used state of the mobile phone (reference numeral 2 in FIG. 1). As shown in FIG. 2(b), the cord portions are jointed to one another by jointing portions 19.

In case of attaching the earphone unit 8 to the neck strap 3, three lines, which extend from branching section 9a of the cord 9 in the earphone unit 8, are cut off near the branching section 9a, in order to obtain a first cord portion 9a connected to the plug 18, a second cord portion 9c connected to the left earphone 17 having the microphone, a third cord portion 9d connected to the right earphone having 17 the microphone, and a branching cord portion 9e. The first cord portion 9b is penetrated from an outer side to an inner side in the first aperture 15a. The second cord portion 9c is penetrated from an outer side to an inner side in the third aperture 15c and is wired in the left container section 6. The second cord portion 9c is penetrated from an inner side to an outer side in the second aperture 15b. The third cord portion 9d is penetrated from an outer side to an inner side in the fifth aperture 15e and is wired in the right container section 6. The third cord portion 9d is penetrated from an inner side to an outer side in the fourth aperture 15d. After each of the first cord portion 9b, the second cord portion 9c, and the third cord portion 9d is cut into a predetermined length which is adapted to the length of neck strap 3 and which is adapted to the used state of mobile phone implement 1, the first cord portion 9b, the second cord portion 9c, and the third cord portion 9d are connected to the correspondence locations of the branching cord portion 9e, using the jointing sections 19.

Figure 3:
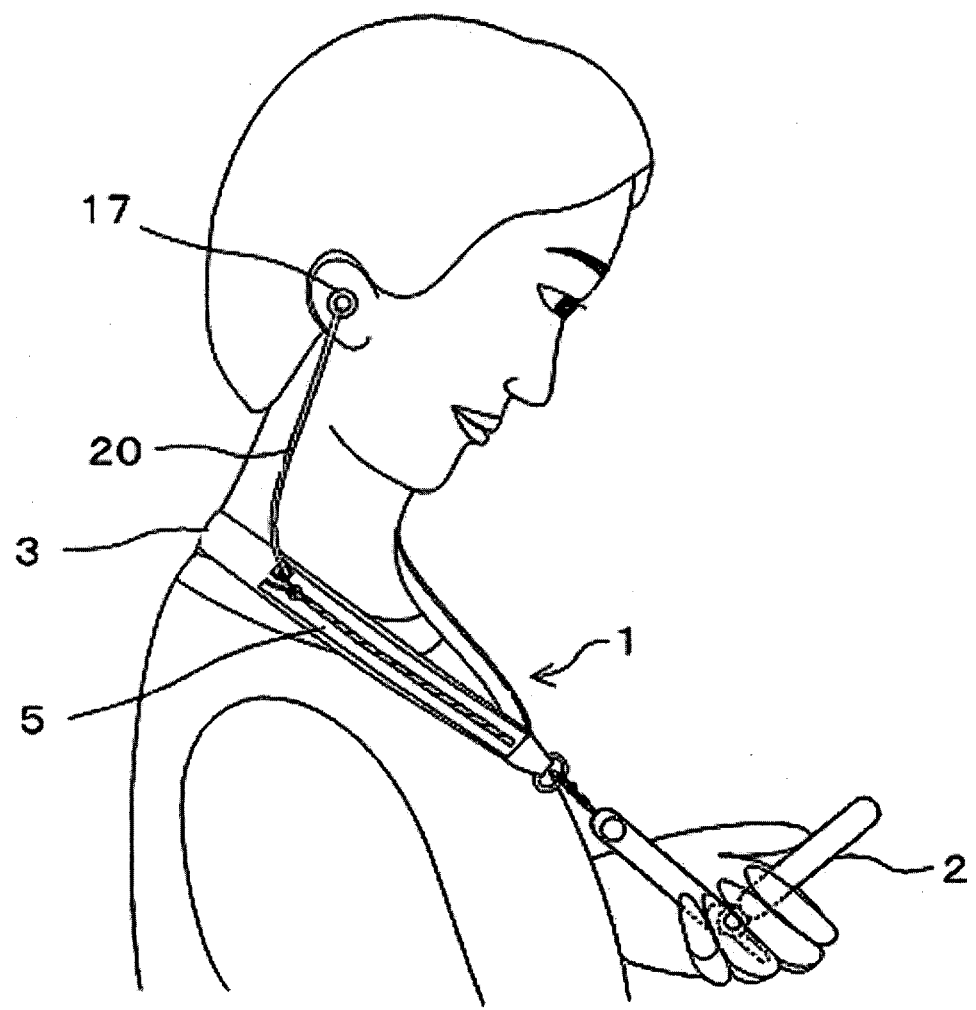
FIG. 3 is a perspective view illustrating the mobile phone implement claimed in Claim 2 of the present invention attached to the mobile phone and used with the mobile phone implement suspended from a neck.

FIG. 3 shows the above-mentioned mobile phone implement 1 in its used state. The mobile phone implement 1 is attached to the mobile phone 2 by the connecting string 12 and the plug 18 is installed on the mobile phone 2. The mobile phone 2 is suspended from the neck by hanging the mobile phone implement 1 from the neck. The earphones 17 having the microphones are positioned on the ears. The mobile phone 2 opens so that the screen may be watched and is held by hand. In this state, it is possible to hear the sound from the mobile phone 2 while watching the picture and to communicate with another mobile phone. Furthermore, it is possible to use the mobile phone as a television phone or it is possible to watch television Incidentally, it is possible to hear music when the screen of mobile phone 2 is closed and the mobile phone 2 is suspended from the neck so that the hand may be released from the mobile phone 2, in case of hearing music from the mobile phone 2 and in case where it is unnecessary to watch the picture.

Figure 4:
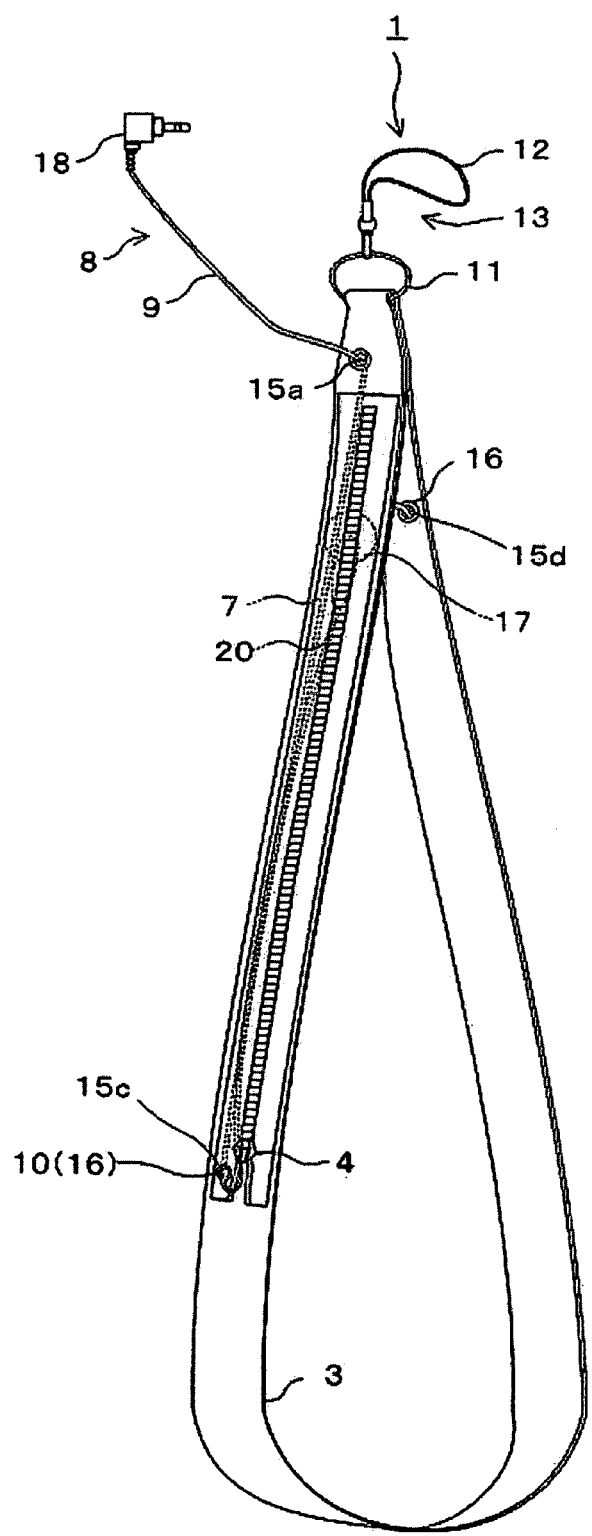
FIG. 4 is a perspective view illustrating an earphone having a microphone and a cord portion stored in the mobile phone implement claimed in Claim 2 of the present invention.

Description will be made as regards storing the earphones 17 having microphones and the earphone side cord portions 20 which are connected to the earphones 17, in the state of FIG. 2. The user makes the slider 4 of fastener 5 slide to the base end of neck strap 3, in order to open the fastener 5. The user folds back the cord 9 by the folding means 10. The user stores the earphones 17 having microphones and the earphone side cord portions 20 in the container section 6 and closes the fastener 5. FIG. 4 shows the state in which the earphones 17 having microphones and the earphone side cord portions 20 are stored in the container section 6.

Incidentally, it is possible to store the earphones 17 having microphones and the earphone side cord portions 20 in the container section 6, as shown in FIG. 4, in a condition of installing the mobile phone implement 1 to the mobile phone 2, namely, in a condition of connecting the connecting string 12 to the mobile phone 2 and inserting the plug 18 of earphone unit 8 into the mobile phone 2.

In addition, it is possible easily take the earphones 17 having microphones and the earphone side cord portions 20 out of the container section 6 when opening the fastener 5, in case of using the earphones 17 having microphones.

As described above, it is possible to hear sound from the mobile phone 2 without positioning the mobile phone main body 2a to the ear when using the mobile phone implement 1. Alternatively, it is possible to communicate with another mobile phone without positioning the mobile phone main body 2a to an ear, when using the mobile phone implement 1. Furthermore, it is possible to easily store the earphones 17 having microphones and the earphone side cord portions 20 in the container section 6 and it is possible to easily take the earphones 17 having microphones and the earphone side cord portions 20 out of the container section 6.

In addition, it is possible to prevent the first through the fifth apertures 15a to 15e from being damaged by the eyelets 16 and it is possible to make the cord 9 move smoothly, inasmuch as the eyelets 16 are formed on the first through the fifth apertures 15a to 15e.

Furthermore, the length of cord 9 may be adjusted in correspondence to the neck strap 3 inasmuch as the cord 9 is cut into the predetermined length which is adapted to the length of neck strap 3 and the used state of neck strap 3 and the cut portions are connected to one another by the jointing sections 19. As a result, it is possible to make the convenience be good and it is possible for the appearance to be good.

Still further, the earphone unit 8 comprises two earphones 17 having the microphones for being positioned in the left and the right ears, respectively. As a result, it is possible to listen with both ears or it is possible to listen in stereo sound. Inasmuch as each of the left and the right neck strap portions 3a and 3b, which are positioned near the base end portion of neck strap 3, has the container section 6, in order to store two earphones 17 having the microphones and the earphone side cord portions 20 which are connected to two earphones 17 having the microphones, it is possible to easily store the earphones 17 having the microphones and the earphone side cord portions 20 in the container sections 6 and it is possible to easily take the earphones 17 having the microphones and the earphone side cord portions 20 out of the container sections 6. Incidentally, it is possible to make the earphone unit have one earphone having microphone that is positioned on one ear. In addition, it is possible to make the earphone unit have an earphone having no microphone, in stead of the earphone having the microphone.

Figure 5:
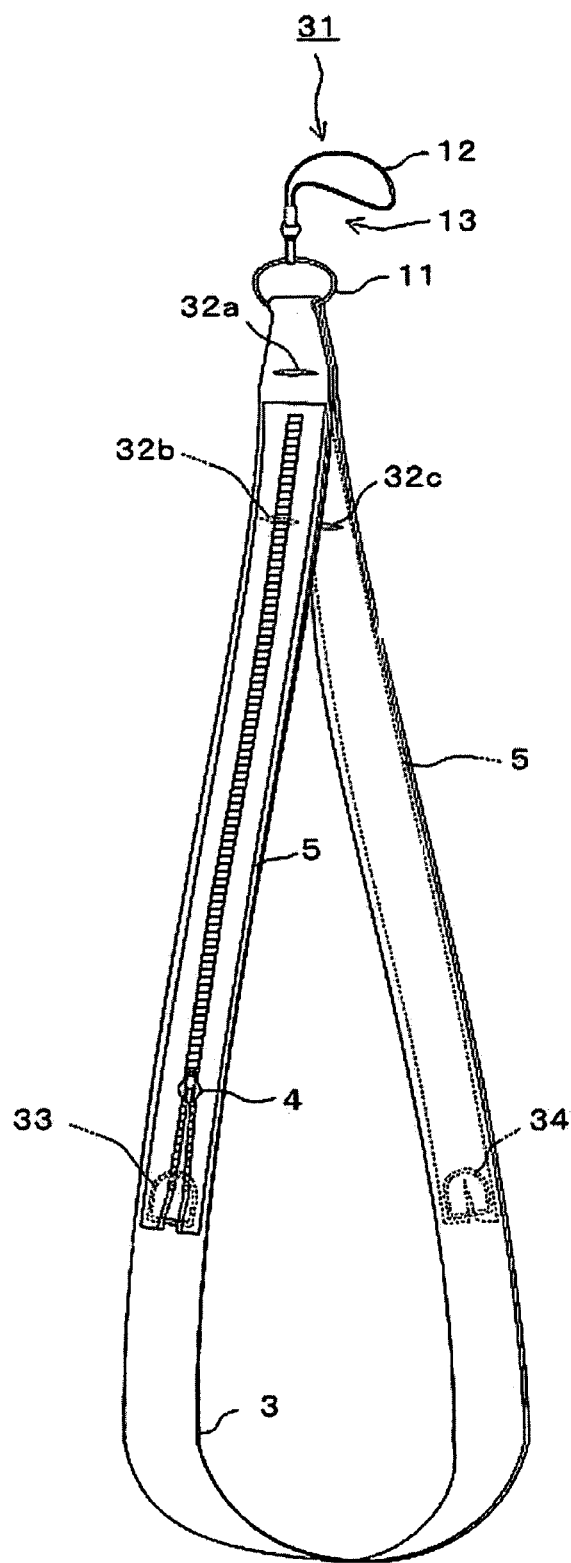
FIG. 5 is a perspective view illustrating a mobile phone implement as claimed in Claim 1 of the present invention.

In FIG. 5, a reference numeral 31 represents a mobile phone implement. The mobile phone implement 31 does not have the earphone unit (reference numeral 8 in FIG. 1) which is provided in the above-mentioned mobile phone implement (reference numeral 1 in FIG. 1). A commercial earphone unit may be retrofitted with the mobile phone implement 31.

The mobile phone implement 31 comprises a first aperture 32a having a size through which the earphone having the microphone of earphone unit is capable of being penetrated, instead of the first aperture (reference numeral 15a in FIG. 2) of the above-mentioned mobile phone implement (reference numeral 1 in FIG. 1). The mobile phone implement 31 comprises a second aperture 32b having a size through which the plug (not shown) is capable of being penetrated, instead of the second aperture (reference numeral 15b in FIG. 2). The mobile phone implement 31 comprises a stopper ring 33 which is used as the folding means and which is positioned near the open beginning end of fastener 5, instead of the third aperture (reference numeral 15c in FIG. 2). The mobile phone implement 31 comprises a third aperture 32c having a size through which the earphone having the microphone is capable of being penetrated, instead of the fourth aperture (reference numeral 15d in FIG.

2). Furthermore, the mobile phone implement 31 comprises a stopper ring 34 which is used as the folding means and which is positioned near the open beginning end of fastener 5, instead of the fifth aperture (reference numeral 15e in FIG. 2).

Figure 6:
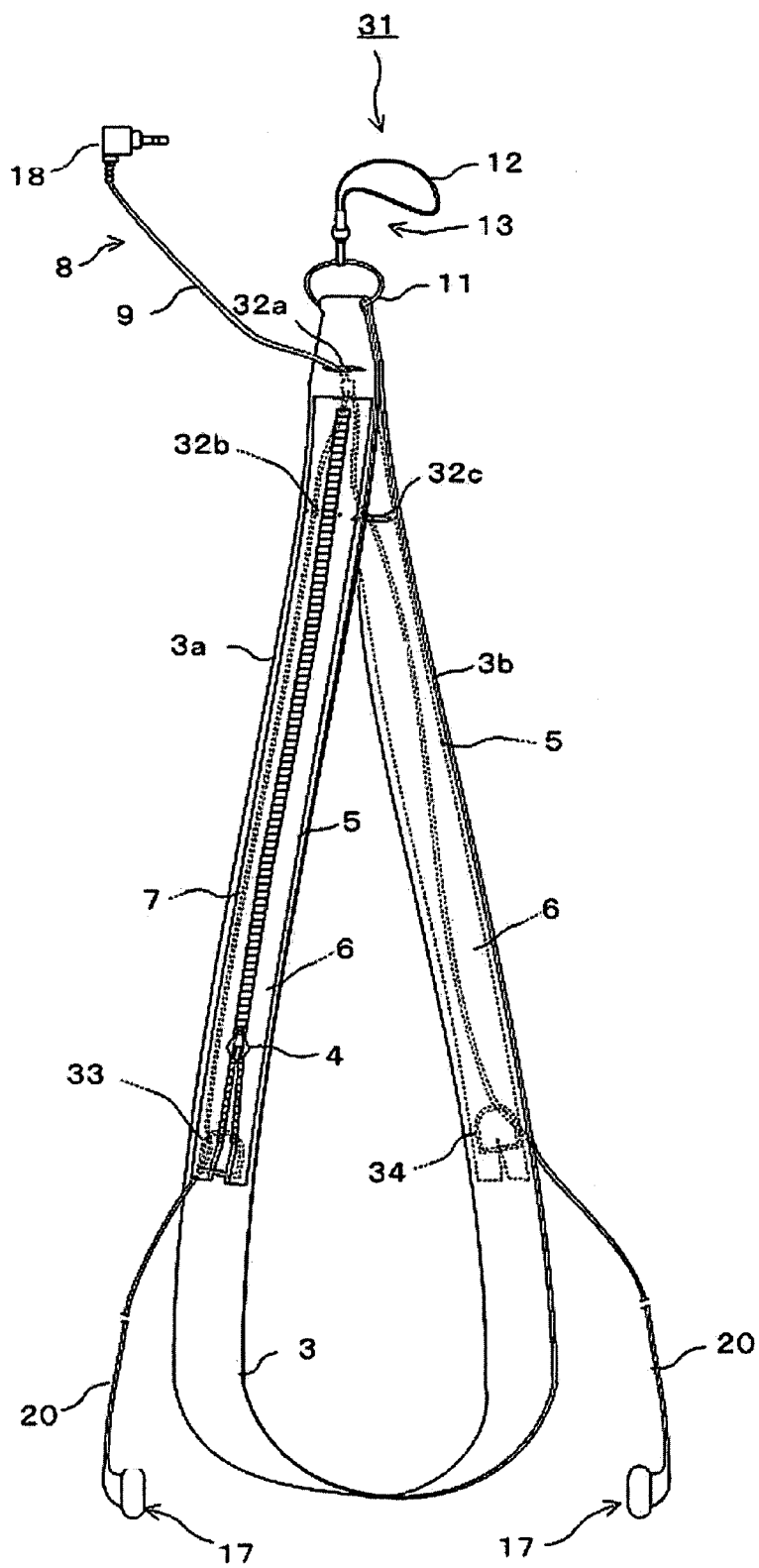
FIG. 6 is a perspective view illustrating an earphone unit attached to the mobile phone claimed in Claim 1 of the present invention.

FIG. 6 shows a state in which the earphone unit 8 is attached to the above-mentioned mobile phone implement 31. Incidentally, the earphone unit 8 is a commercial unit and is not cut as described in conjunction to FIG. 2. But, the earphone unit may be cut into an adjusted length.

Description will be made as regards a method of attaching the earphone unit to the mobile phone implement 31.

At first, the plug 18 of earphone unit 8 is penetrated from the inner side of the left neck strap portion 3a into the first aperture 32a and projects to the left direction of the left neck strap portion 3a. The fastener 5 of the left neck strap 3a is opened. The left side earphone 17 having the microphone is penetrated from the second aperture 32b into the container section 6 in order to make the left side earphone 17 pass through the stopper ring 33 positioned in the container section 6. After the left side earphone 17 projects from the lower end (the lower end in the drawing) of the fastener 5 to the outer direction (the lower direction in the drawing), the fastener 5 is closed. The fastener 5 of the right neck strap 3b is opened. The right side earphone 17 having the microphone is penetrated from the third aperture 32c into the container section 6 in order to make the right side earphone 17 pass through the stopper ring 34 positioned in the container section 6. After the right side earphone 17 projects from the lower end of the fastener 5 to the outer direction, the fastener 5 is closed. As a result, it is possible to attach the earphone unit 8 to the mobile phone implement 31.

In the above-mentioned state, it is possible to use the mobile phone implement 31 in the method shown in FIG. 3.

Figure 7:
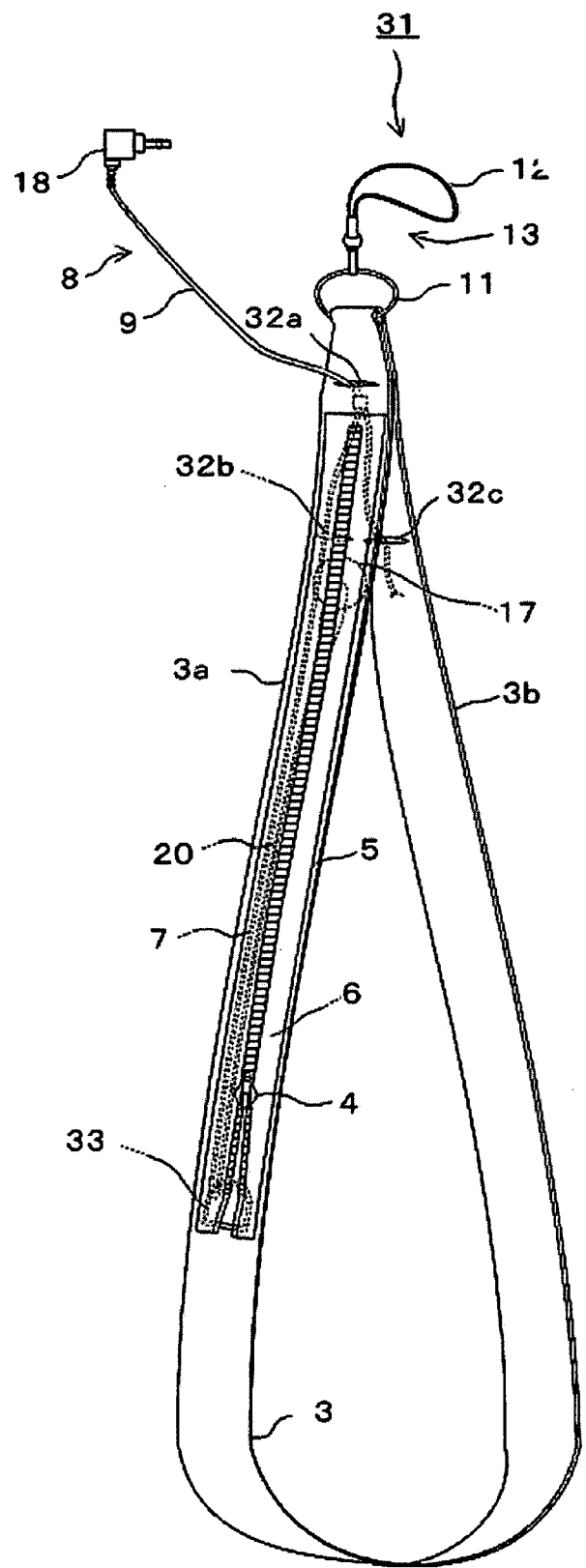
FIG. 7 is a perspective view illustrating the earphone unit attached to the mobile phone implement claimed in Claim 1 of the present invention with the earphone having the microphone and the cord portion of earphone side are stored in the mobile phone implement.

Next, description will be made as regards storing the earphones 17 having the microphones and the earphone side cord portions 20 connected to the earphones 17 having the microphones, in the state shown in FIG. 6. A user makes the slider 4 of the fastener 5 slide towards the base end of the neck strap 3 in order to open the fastener 5. The cord 9 is folded by stopper ring 33 or 34. After the earphone 17 having the microphone and the earphone side cord portion 20 are stored in the container section 6, the fastener 5 is closed. FIG. 7 shows a state in which the earphone 17 having the microphone and the earphone side cord portion 20 are stored in the container section 6.

In addition, it is possible to easily take the earphone 17 having the microphone and the earphone side cord portion 20 out of the container section 6, when opening the fastener 5.

As described above, it is possible to hear the sound from the mobile phone 2 without positioning the mobile phone main body (reference numeral 2a in FIG. 1) to an ear, when using the mobile phone implement 31. Alternatively, it is possible to communicate with another mobile phone without positioning the mobile phone main body 2a to an ear, when using the mobile phone implement 31. Furthermore, it is possible to easily store the earphones 17 having microphones and the earphone side cord portions 20 in the container section 6 and it is possible to easily take the earphones 17 having microphones and the earphone side cord portions 20 out of the container section 6.

Still further, the earphone unit 8 comprises two earphones 17 having the microphones for be positioned on the left and the right ears, respectively. Inasmuch as each of the left and the right neck strap portions 3a and 3b, which are positioned near the base end portion of neck strap 3, has the container section 6, in order to store two earphones 17 having the microphones and the earphone side cord portions 20 which are connected to two earphones 17 having the microphones, it is possible to listen in the stereo sound. It is possible to easily store the earphones 17 having the microphones and the earphone side cord portions 20 in the container sections 6 and it is possible to easily take the earphones 17 having the microphones and the earphone side cord portions 20 out of the container sections 6.

In addition, it is possible to make the mobile phone implement 31 inexpensively in unit price, inasmuch as the earphone unit 8 is not attached to the mobile phone implement 31 when selling the mobile phone implement 31. It is possible to use the inexpensive commercial unit as the earphone unit 8 and it is possible to easily attach the commercial unit to the mobile phone implement 31.

Figure 8:
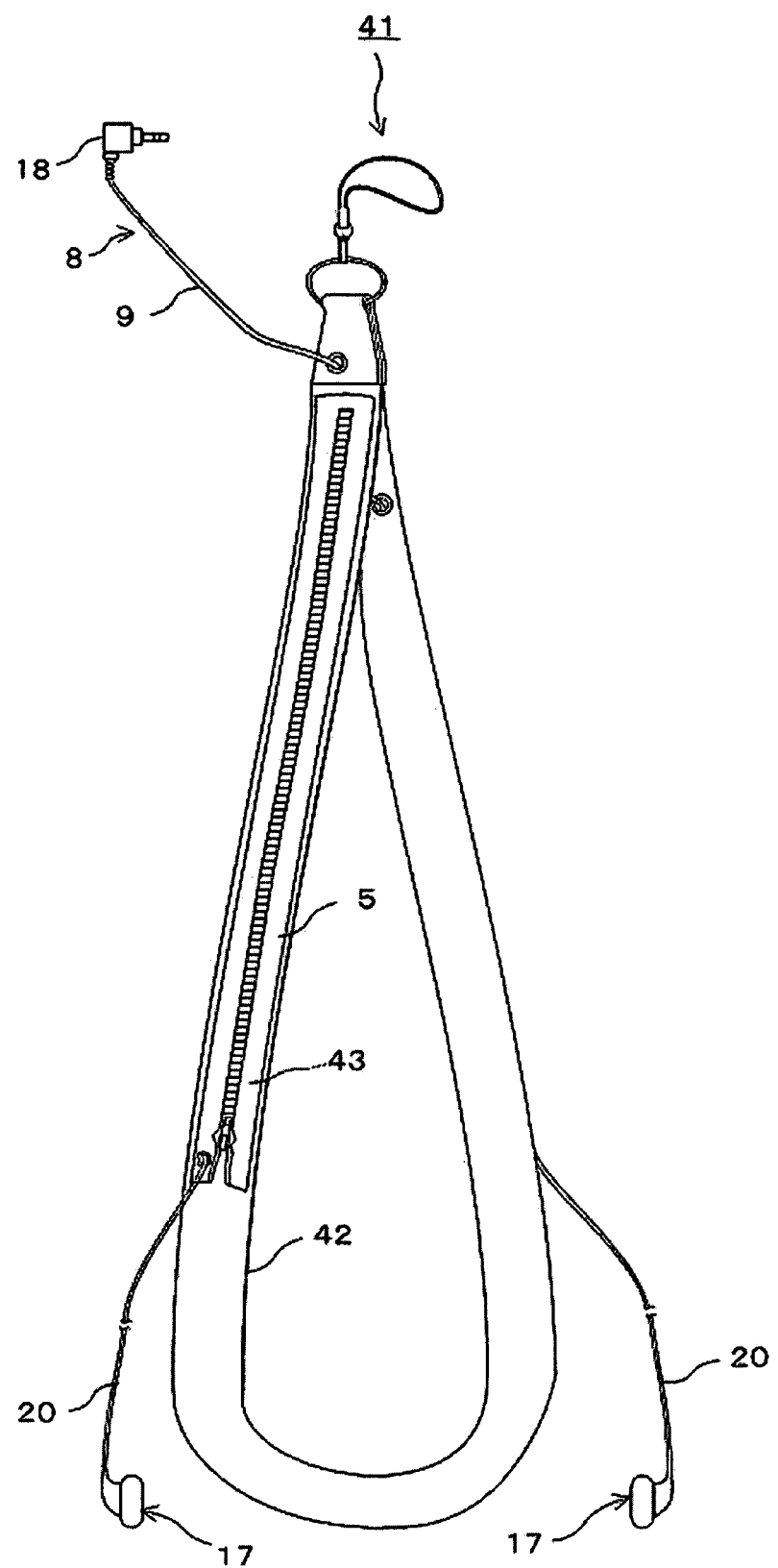
FIG. 8 is a perspective view illustrating a mobile phone implement claimed in Claim 5 of the present invention.

In FIG. 8, a reference numeral 41 represents a mobile phone implement. The mobile phone implement 41 comprises a neck strap 42 which is shaped at least attaching part of the fastener 5 into a hollow shape in a cross section, instead of the belt shaped neck strap (the reference numeral 3 in FIG. 2) of the mobile phone implement (the reference numeral 1 in FIG. 2).

As shown in FIG. 8, it is possible to make hollow section 43 be the container section when a part of neck strap 42 is opened. As a result, it is possible to make the volume of container section large. Inasmuch as the volume of container section becomes large, it is possible to make the width of neck strap 42 small.

Figure 9:
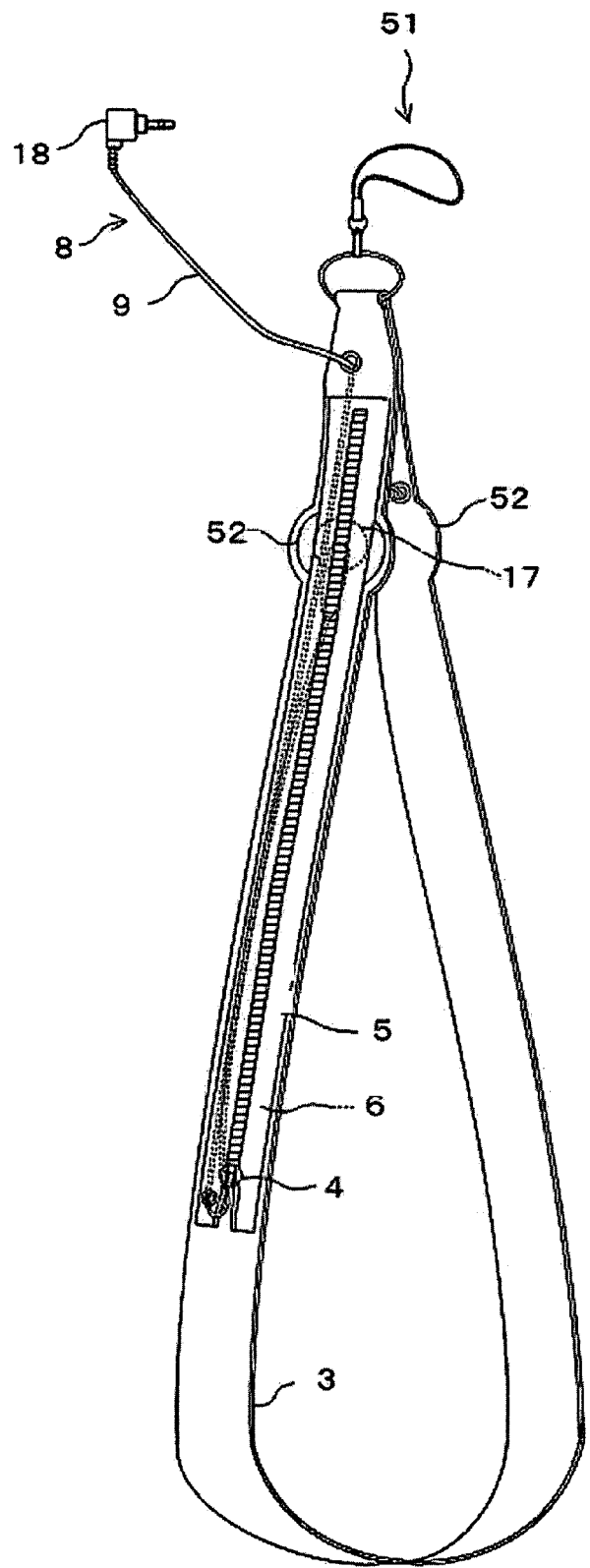
FIG. 9 is a perspective view illustrating a mobile phone implement claimed in Claim 6 of the present invention.

In FIG. 9, a reference numeral 51 represents a mobile phone. The mobile phone implement 51 comprises a container section 52 of large volume, in order to expand a space of the part in which the earphones 17 having the microphones are stored in the mobile phone implement (the reference numeral 1 in FIG. 2).

As shown in FIG. 9, it is possible to further easily store the earphones 17 having the microphones in the container and it is possible to easily take the earphones 17 having the microphones out of the container.

Figure 10:
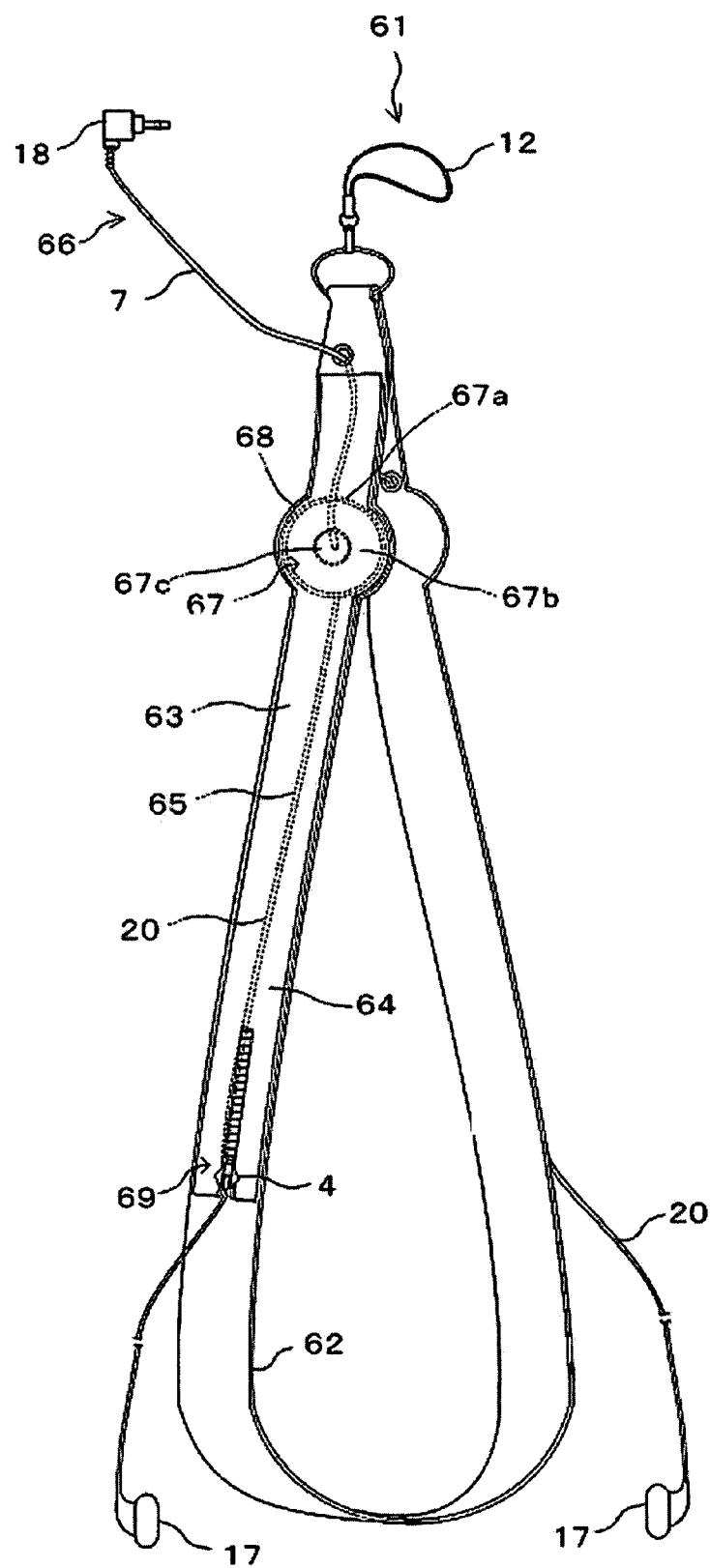
FIG. 10 is a perspective view illustrating a mobile phone implement as claimed in Claim 7 of the present invention.

In FIG. 10, a reference numeral 61 represents a mobile phone implement of another embodiment. The mobile phone implement 61 is capable of being attached to the mobile phone (the reference numeral 2 in FIG. 2) and comprises a neck strap 62, a cloth shaped body 64, an earphone unit 66, a reel section 67, a reel storing section 68, and a fastener section 69. The neck strap 62 has a predetermined width and is capable of being suspended from neck of human beings. The cloth shaped body 64 is attached from the base end portion of the neck strap 62 towards the longitudinal direction of the neck strap 62 and is for use in forming a container section 63 between the neck strap 62 and the cloth shaped body 64. The earphone unit 66 has a cord which is capable of being connected to the mobile phone. The cord portion 65 of the earphone unit 66 is capable of being stored in the container section 63. The reel section 67 is pushed towards one direction and is capable of reeling the earphone side cord portion 20 of the earphone unit 66. Furthermore, the reel section 67 is capable of stopping the reeling motion of the earphone side cord portion 20 by a ratchet mechanism (not shown) and has a rotatable electric connecting section (not shown). The reel storing section 68 is formed in a part of the container section 63 and is for use in storing reel section 67. The fastener section 69 has a predetermined length and is formed on a tip portion of the cloth shaped body 64. The fastener section 69 makes the slider 4 slide to carry out a partial open and close motion of the container section 63 and is capable of storing the earphones 17 having the microphones, in the container section 63.

The above-mentioned reel section 67 has a rotational reel portion 67b which is pushed towards one direction in a housing 67a. The reel section 67 is configured to automatically reel the earphone side cord portion 20 which is connected to the earphone 17 having the microphone. The plus and the minus ends (not shown) of the earphone side cord portion 20 are connected to a first contact portion (not shown) which has plus and minus contacts and which is formed on the rotational reel portion 67b. On the other hand, the plus and the minus ends (not shown) of the plug side cord portion 7 are fixed to the housing 67a and are connected to a second contact portion (not shown) which has plus and minus contacts and which is formed on the rotational supporting portion 67c for rotatably supporting the rotational reel portion 67b.

When the rotational reel portion 67b rotates, homopolar contacts are always contact with each other between the first contact portion having the plus and the minus ends and the second contact portion having the plus and the minus ends.

When the earphone side cord portion 20, which is connected to the earphone 17 having the microphone, is pulled out in an optional length and is slacked off, the ratchet mechanism acts to restrain the rotation of the rotational reel portion 67b that is towards reeling direction. As a result, the earphone side cord portion 20 is held in a pulled length.

When the earphone side cord portion 20, which is connected to the earphone 17 having the microphone, is pulled out in a maximum length, the ratchet mechanism is released so that the rotational reel portion 67b rotates towards a pre-pushed direction and the earphone side cord portion 20 is automatically reeled in.

When the fastener section 69 is opened and the earphone 17 having the microphone is pulled out in the stored state of the earphone 17 having the microphone, the rotational reel portion 67b of the reel section 67 rotates so that the earphone 17 having the microphone is pulled out together with the earphone side cord portion 20. The earphone side cord portion 20 is held in the pulled length by the ratchet mechanism. When the fastener section 69 is closed, it is possible to use the earphone 17 having the microphone.

On storing the earphone 17 having the microphone, the ratchet mechanism is released so that the rotational reel portion 67b rotates towards a pre-pushed direction and the earphone side cord portion 20 is automatically reeled in, when the earphone side cord portion 20 is pulled out by the maximum length.

Figure 11:
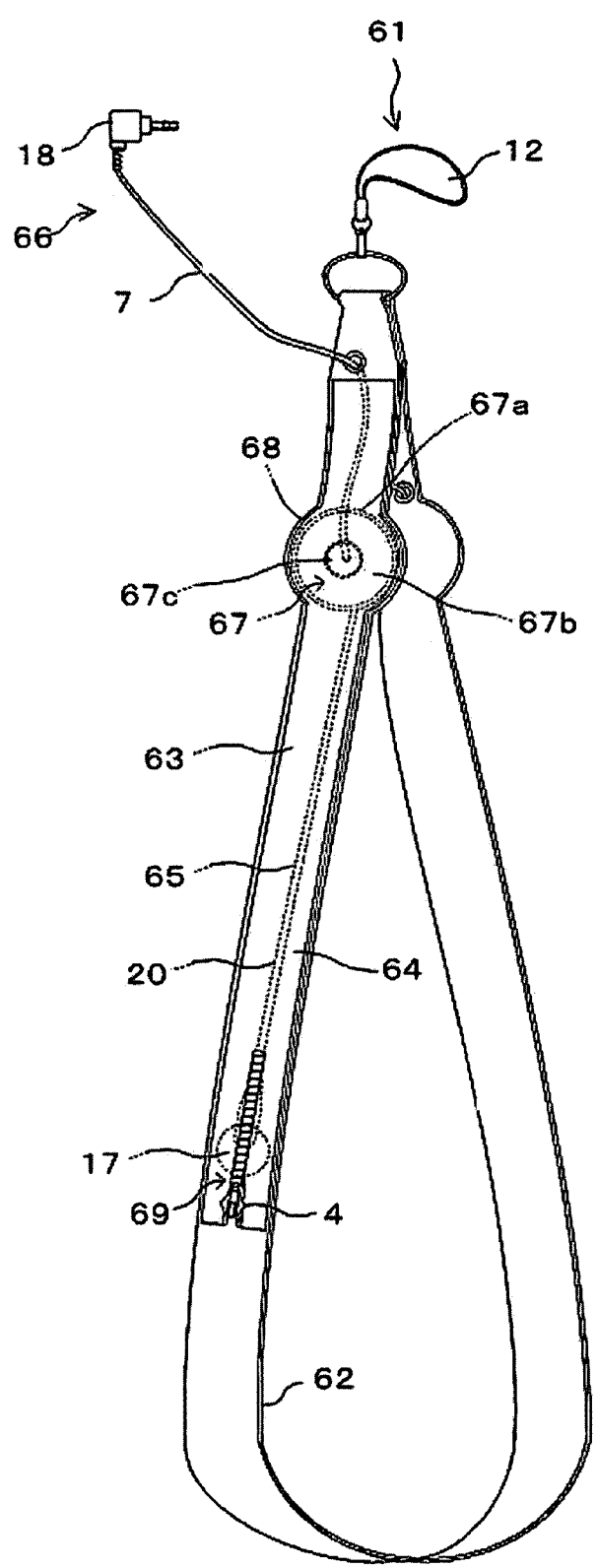
FIG. 11 is a perspective view illustrating an earphone having a microphone and a cord portion stored in the mobile phone implement claimed in Claim 7 of the fifth embodiment of the present invention.

After opening the fastener section 69 and storing the earphone 17 with the microphone in the container section 63, the fastener section 69 is closed. As a result, the earphone 17 having the microphone and the earphone side cord portion 20 are perfectly stored in the container section 63, as shown in FIG. 11.

Incidentally, a stopper may be formed in order to stop the earphone 17 having the microphone at an appropriate position in the container section 63 and to prevent the earphone 17 having the microphone from pulling in the bottom of the container section 63. For example, the stopper may be formed by partially sewing the cloth shaped body 64 and the neck strap 62.

As described above, it is possible to hear the sound from the mobile phone 2 without positioning the mobile phone main body (reference numeral 2a in FIG. 1) to an ear in a similar manner described in conjunction to the mobile phone implement (the reference numeral 1 in FIG. 1), when using the mobile phone implement 61. Alternatively, it is possible to communicate with another mobile phone without positioning the mobile phone main body 2a to an ear, when using the mobile phone implement 61. Furthermore, it is possible to easily pull out the earphone side cord portion 20 of the earphone 17 having microphone in a desired length and to position the earphone 17 having microphone on an ear. In addition, it is possible to automatically store the earphone 17 having microphone and the earphone side cord portion 20.

Figure 12:
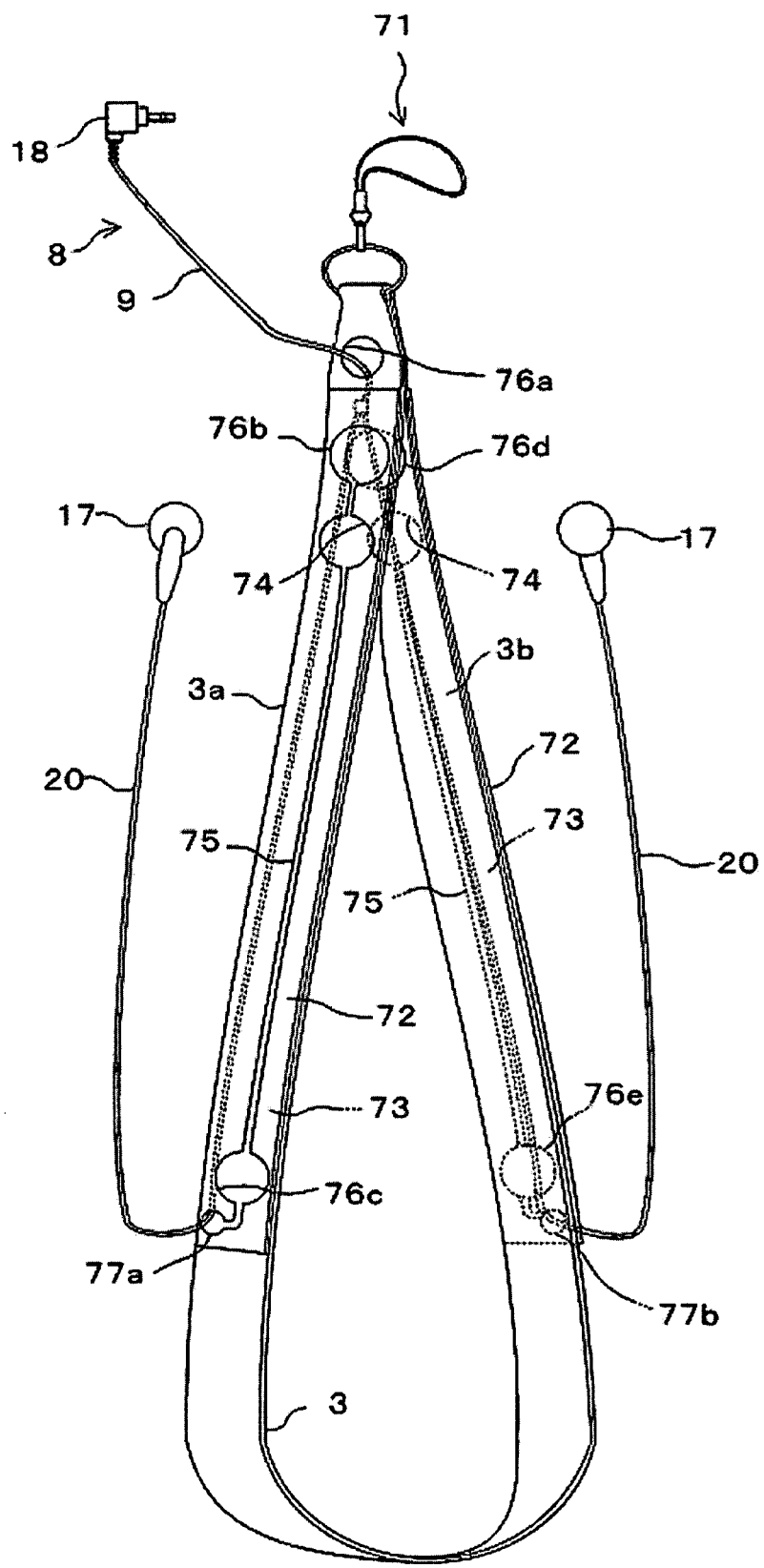
FIG. 12 is a perspective view illustrating a mobile phone implement as claimed in Claim 8 of the present invention.
Figure 13:
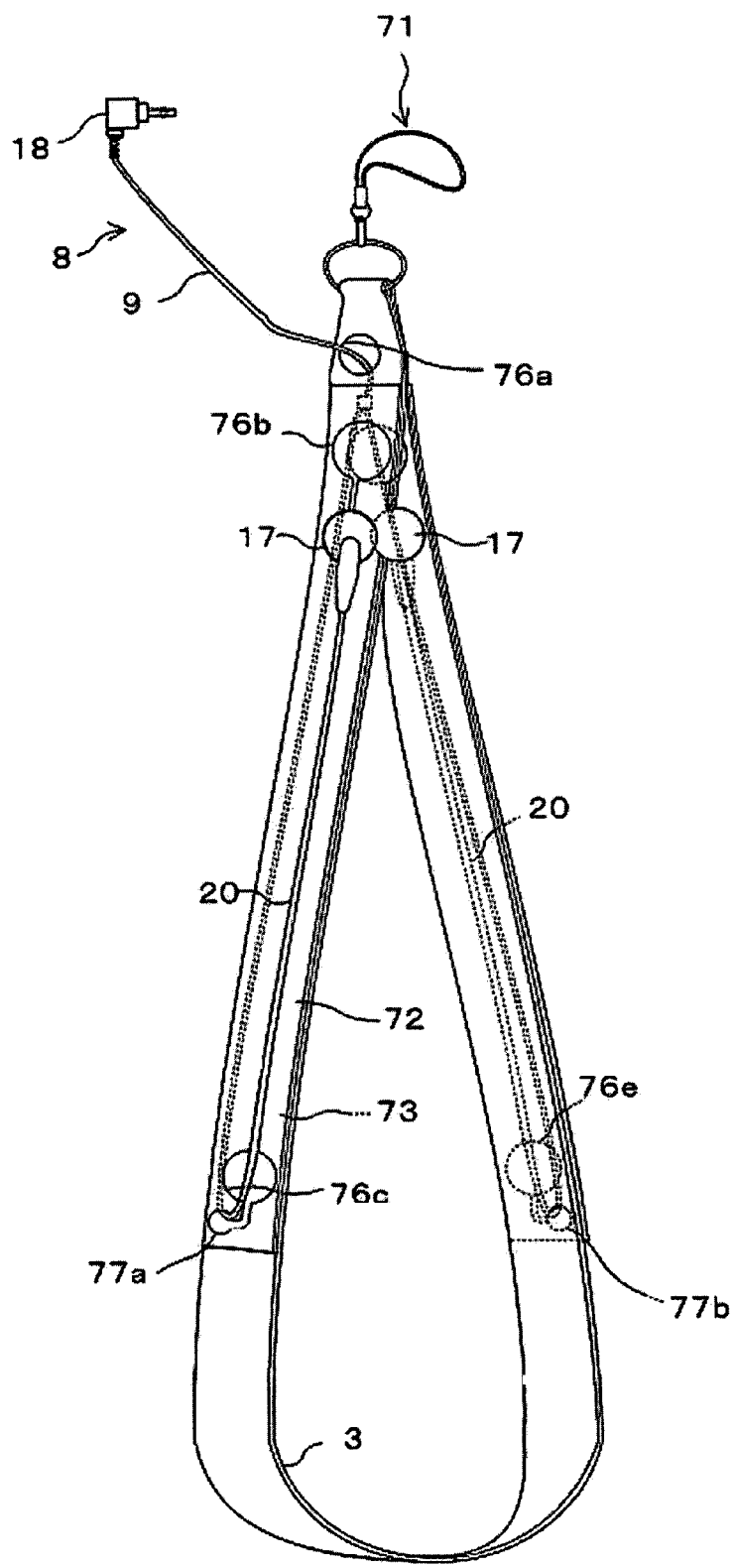
FIG. 13 is a perspective view illustrating an earphone having microphone and a cord portion stored in the mobile phone implement as claimed in Claim 8 of the present invention.

In FIG. 12, a reference numeral 71 represents a mobile phone implement of another embodiment. The mobile phone implement 71 comprises a flexible member 72 which has a predetermined length and which is composed of a soft resin, rubber material, or the like, instead of the fastener (the reference numeral 5 in FIG. 6) of the mobile phone implement (the reference numeral 31 in FIG. 6). The flexible member 72 is attached from the base end portion of the neck strap 3 towards the longitudinal direction of the neck strap 3. A container section 73 is formed between the flexible member 72 and the neck strap 3 by attachment of the flexible member 72. Incidentally, the mobile phone implement 71 does not have the earphone unit (reference numeral 8 in FIG. 6) and the commercial earphone unit is retrofitted with the mobile phone implement 71.

In order to be capable of setting the earphone 17 having the microphone of the earphone unit 8 having the cord in the flexible member 72, a setting section 74 is formed on the flexible member 72. The setting section 74 has a diameter which is slightly smaller than the earphone 17 having the microphone. The setting section 74 holds the earphone 17 having the microphone in a suppressed state. A long groove 75, which communicates with the setting section 74, is formed along the longitudinal direction of the flexible member 72.

The long groove 75 has a width which is slightly smaller than the diameter of the cord 9. The cord 9 is pushed in the long groove 75 and is held in the suppressed state. Alternatively, the cord 9 extends along the long groove 75. The cord 9 is stored in the container section 63.

In order to install the earphone unit 8 in the mobile phone implement 71, the mobile phone implement 71 comprises a first aperture 76a having a size through which the plug 18 is capable of being penetrated, instead of the first aperture (reference numeral 32a in FIG. 6) of the above-mentioned mobile phone implement (reference numeral 31 in FIG. 6). The first aperture 76a is formed on the base end portion of the left neck strap portion 3a. The mobile phone implement 71 comprises a second aperture 76b having a size through which the earphone 17 having microphone is capable of being penetrated, instead of the second aperture (reference numeral 32b in FIG. 6). The second aperture 76b is formed near the beginning end (the upper end in the drawing) of the flexible member 72 through the left neck strap portion 3a and the flexible member 72. The mobile phone implement 71 comprises a third aperture 76c having a size through which a fingertip is capable of being penetrated. The third aperture 76c is formed near an end (the lower end in the drawing) of the flexible member 72 of the left neck strap portion 3a. The mobile phone implement 71 comprises a first small aperture 77a which has a diameter smaller than the third aperture 76c and which is used as the folding means. The first small aperture 77a is apart from the third aperture 76c to a side direction of the left neck strap portion 3a during a predetermined interval. The mobile phone implement 71 comprises a fourth aperture 76d having a size through which the earphone 17 having microphone is capable of being penetrated, instead of the third aperture (reference numeral 32c in FIG. 6). The fourth aperture 76d is formed near the beginning end (the upper end in the drawing) of the flexible member 72 through the right neck strap portion 3b and the flexible member 72. The mobile phone implement 71 comprises a fifth aperture 76e having a size through which the fingertip is capable of being penetrated. The fifth aperture 76e is formed near an end (the lower end in the drawing) of the flexible member 72 of the right neck strap portion 3b. The mobile phone implement 71 comprises a second small aperture 77b which has a diameter smaller than the fifth aperture 76e and which is used as the folding means. The second small aperture 77b is apart from the fifth aperture 76e to a side direction of the right neck strap portion 3b during the predetermined interval.

In the flexible member 72 attached to the left neck strap portion 3a, the long groove 75 communicates with the setting section 74 through the second aperture 76b and communicates with the third aperture 76c. Furthermore, the long groove 75 passes through the third aperture 76c and changes the extending direction in an approximate right angle, in order to communicate with the first small aperture 77a.

In the flexible member 72 attached to the right neck strap portion 3b, the long groove 75 communicates with the setting section 74 through the fourth aperture 76d and communicates with the fifth aperture 76e. Furthermore, the long groove 75 passes through the fifth aperture 76e and changes the extending direction in an approximate right angle, in order to communicate with the second small aperture 77b.

Description will be made as regards a method of attaching the earphone unit 8 to the mobile phone implement 71.

At first, the plug 18 of earphone unit 8 is penetrated from the inner side of the left neck strap portion 3a into the first aperture 76a and projects to the left direction of the left neck strap portion 3a. The fastener 5 of the left neck strap 3a is opened. The left side earphone 17 having the microphone is penetrated from the second aperture 76b into the left direction and the cord 9 is stored in the container section 73. The cord 9 is penetrated from the first small aperture 77a to an outer direction and the right side earphone 17 having the microphone is penetrated from the fourth aperture 76d to a right direction. The cord 9 is stored in the container section 73 and the cord 9 is penetrated from the second small aperture 77b to an outer direction. As a result, it is possible to attach the earphone unit 8 to the mobile phone implement 71.

In the above-mentioned state, it is possible to use the mobile phone implement 71 in the method shown in FIG. 3.

Next, description will be made as regards storing the earphones 17 having the microphones and the earphone side cord portions 20 connected to the earphones 17 having the microphones, in the state shown in FIG. 11. As shown in FIG. 11, the cord 9 is folded in the first small aperture 77a or the second small aperture 77b. In a condition of stopping the cord 9 in the first small aperture 77a or the second small aperture 77b, the earphone side cord portion 20 is pushed in the third aperture 76c or the fifth aperture 76e by the fingertip. Furthermore, the earphone side cord portion 20 is pushed in the long groove 75 and is held in the long groove 75 in the suppressed state. Alternatively, the earphone side cord portion 20 passes along the long groove 75 to be stored in the container section 73. In addition, the earphone 17 having the microphone is set on the setting section 74 to be stored in the setting section 74.

In addition, it is possible to easily take the earphone 17 having the microphone, when pulling the earphone 17 having the microphone out of the setting section 74. When pulling out the earphone 17 having the microphone, the earphone side cord portion 20 is pulled out. As a result, it is possible to take the earphone side cord portion 20 out of the setting section 74.

As described above, it is possible to hear sound from the mobile phone 2 without positioning the mobile phone main body (reference numeral 2a in FIG. 1) to an ear, when using the mobile phone implement 71. Alternatively, it is possible to communicate with another mobile phone without positioning the mobile phone main body 2a to an ear, when using the mobile phone implement 71. Furthermore, it is possible to easily store the earphones 17 having microphones and the earphone side cord portions 20 and it is possible to easily take the earphones 17 having microphones and the earphone side cord portions 20.

In addition, it is possible to make the mobile phone implement 71 inexpensively in unit price, inasmuch as the earphone unit 8 is not attached to the mobile phone implement 71 on selling the mobile phone implement 71. It is possible to use the inexpensive commercial unit as the earphone unit 8 and it is possible to easily attach the commercial unit to the mobile phone implement 31.

I claim:

1. A mobile phone implement, comprising:
   a neck strap having a predetermined width that is capable of being attached to a mobile phone and being suspended from a neck of human being;
   a fastener having a predetermined length that is attached from a base end portion of said neck strap towards a longitudinal direction of said neck strap, said fastener making a slider slide towards a direction of the base end portion of said neck strap to carry out an open motion;
   a container section formed between said neck strap and said fastener on the basis of attachment of said fastener;
   folding means positioned near an open beginning end of said fastener for bending a cord to fold said cord provided to an earphone unit which is capable of being connected to said mobile phone; and
   said mobile phone implement being configured to store a plug side cord portion of said earphone unit in said container section and to store an earphone and an earphone side cord portion of said earphone unit that is folded by said folding means.

2. A mobile phone implement as claimed in claim 1, wherein said neck strap is shaped into a hollow shape in a cross section in an attached part of the neck strap that is attached to said fastener.

3. A mobile phone implement as claimed in claim 1, wherein a part which is for use in storing said earphone has a large volume in said container section, in order to easily store said earphone in said container section.

4. A mobile phone implement as claimed in claim 1, wherein:
   said earphone unit comprises two earphones which are positioned on left and right ears, respectively; and
   said container section being provided to each of left and right neck strap portions which are positioned near a base end portion of said neck strap, in order to store two earphone and cords which are connected to two earphones, respectively.

5. A mobile phone implement as claimed in claim 1, wherein said earphone has a microphone.

6. A mobile phone implement, comprising:
   a neck strap having a predetermined width that is capable of being attached to a mobile phone and being suspended from a neck of human being;
   a fastener having a predetermined length that is attached from a base end portion of said neck strap towards a longitudinal direction of said neck strap, said fastener making a slider slide towards a direction of the base end portion of said neck strap to carry out an open motion;

a container section formed between said neck strap and said fastener on the basis of attachment of said fastener;

an earphone unit having a cord whose plug side cord portion is stored in said container section, said earphone unit being capable of being connected to said mobile phone;

folding means positioned near an open beginning end of said fastener for bending a cord to fold said cord provided to said earphone unit; and said mobile phone implement being configured to store an earphone and an earphone side cord portion of said earphone unit that is folded by said folding means.

7. A mobile phone implement as claimed in claim 6, wherein:

an aperture is formed on said neck strap and/or said fastener near both ends of said container section; and an eyelet being formed in said aperture.

8. A mobile phone implement as claimed in claim 6, wherein:

said cord is cut into a predetermined length which is adapted to said neck strap and a used state; and cut portions being connected to each other by jointing portions.

9. A mobile phone implement, comprising:

a neck strap having a predetermined width that is capable of being attached to a mobile phone and being suspended from a neck of human being;

a cloth body attached from a base end portion of said neck strap towards a longitudinal direction of said neck strap, said cloth body forming a container section between said neck strap and said cloth body;

an earphone unit having a cord which is capable of being stored in said container section and which being connected to said mobile phone;

a reel section having a rotatable electric contact portion, said reel section pushed towards one direction for reeling an earphone side cord portion of said earphone unit and for temporarily stop a reeling motion for said earphone side cord portion by a ratchet mechanism;

a reel storing section formed in a part of said container section for storing said reel section therein;

a fastener section having a predetermined length that is positioned at a tip portion of said cloth body, said fastener section making a slider slide to open and close a part of said container section, in order to store an earphone of said earphone unit in said container section; and said mobile phone implement being configured to reel the earphone side cord portion of said earphone to said reel section and to store said earphone by opening and closing said fastener section and to take said earphone side cord portion out of said reel section in an optional length.

10. A mobile phone implement, comprising:

a neck strap having a predetermined width that is capable of being attached to a mobile phone and being suspended from a neck of human being;

a flexible member having a predetermined length that is attached from a base end portion of said neck strap towards a longitudinal direction of said neck strap a container section formed between neck strap and said flexible member by attachment of said flexible member;

a setting section formed on said flexible member for setting an earphone of an earphone unit having a cord which is capable of being connected to said mobile phone;

a long groove formed along a longitudinal direction of said flexible member for communicating with said setting section;

folding means positioned near an end portion of said flexible member for folding the cord of said earphone unit; and said mobile phone implement being configured to store a plug side cord portion of said earphone unit in said container section and to store an earphone side cord portion folded by said folding means, in said long groove with removability, furthermore said mobile phone implement being configured to set said earphone in said setting section with removability.

* * * * *